United States Patent [19]

Leam

[11] 4,421,037
[45] Dec. 20, 1983

[54] WASTE MATERIAL TREATMENT FURNACE

[76] Inventor: John A. Leam, 6445 Fairway Dr., Fayetteville, Pa. 17222

[21] Appl. No.: 376,614

[22] Filed: May 10, 1982

[51] Int. Cl.³ .............................................. F23G 7/04
[52] U.S. Cl. .................................. 110/238; 110/204; 110/225; 110/251; 110/256; 110/336; 110/345; 422/177
[58] Field of Search .............. 110/336, 256, 225, 257, 110/344, 345, 251, 238, 227, 248, 204; 52/410, 511; 422/181, 177

[56] References Cited

U.S. PATENT DOCUMENTS

| | | | |
|---|---|---|---|
| 3,594,131 | 7/1971 | De Palma et al. | 422/181 X |
| 4,018,023 | 4/1977 | Anderson | 52/410 |
| 4,201,141 | 5/1980 | Teodorescu et al. | 110/248 X |

Primary Examiner—Edward G. Favors
Attorney, Agent, or Firm—Reed, Smith, Shaw & McClay

[57] ABSTRACT

A waste material treatment furnace includes a furnace chamber having an interior surface formed by a flexible sheet of an insulating fabric to minimize heat-up and cool-down time and to facilitate interior surface repair. The treatment furnace additionally includes an exhaust gas treatment facility for neutralizing and/or removing undesirable elements from an exhaust gas stream. The treatment facility includes a chamber having inlet and outlet openings, a conduit therebetween defined by wall members permeable to the passage of exhaust gas therethrough. A supply of a selected reactive material is provided in a compartment formed about the periphery of the permeable wall members, and means are provided to move the exhaust gas from within the conduit through the permeable wall members thereof into the selected reactive material within the compartment.

21 Claims, 5 Drawing Figures

WASTE MATERIAL TREATMENT FURNACE

BACKGROUND OF THE INVENTION

FIELD OF THE INVENTION

The invention relates generally to furnaces and more particularly to furnaces useful in the treatment of waste materials such as slurry and sludge materials.

DISCUSSION OF THE TECHNICAL PROBLEM

The disposal of municipal waste sewage and industrial waste slurries has become a substantial societal problem in light of increased environmental concerns and scarcity of suitable land-fill areas. Accordingly, advances have been made toward effective incinerations of such waste materials, the process generally including the steps of drying the considerable water content from the material and thereafter combusting the remainder.

Various facilities exist in the art for performing such a function, the facilities generally sharing the common feature of being fabricated at least in part of conventional refractory bricks which can withstand elevated temperatures and serve to insulate the interior of the furnace from the exterior thereof. Use of such refractory bricks may be disadvantageous, however, because of their substantial expense and because of the prolonged time periods which they mandate for gradual heating-up and cooling-down periods, e.g., 24 hours or longer. Additionally, repairs to the interior of the furnace walls generally require replacement of entire refractory bricks. It would be desirable to have a waste treatment furnace which did not require prolonged heat-up and cool-down periods, and which included an interior surface which was readily repairable.

In addition to the above-discussed limitation existing in waste treatment furnaces, there is substantial environmental concern regarding the acceptability of the exhaust gases which are emitted from such furnaces. Known devices for removing undesirable constituents from the exhaust gas include a "wet scrubber" in which exhaust gases are passed through water jets to entrap particulates therein. However, such a technique results in the formation of a slurry which presents the type of disposal problems which it is the purpose of waste treatment furnaces to eliminate. It would be desirable to have an exhaust gas treatment facility which is simple in construction, effective in neutralizing acidic content in exhaust gases, and capable of recovering valuable solid materials retained in the exhaust gas.

SUMMARY OF THE INVENTION

The present invention provides a waste material treatment furnace which includes interior wall surfaces which minimize heat-up and cool-down time, and facilitate repair activities. Additionally, the treatment furnace of the present invention includes novel exhaust gas treatment facilities which effectively neutralize undesirable acidic content in the exhaust gases, and which may be utilized to recover valuable solid materials from the exhaust gases while avoiding the limitations associated with "wet scrubbers".

The treatment furnace includes a chamber defined by wall members, heating facilities for treating the material to be advanced through the chamber, and lining means defining at least portions of the interior surface of the chamber, the lining means consisting of a flexible sheet of insulating fabric which is able to withstand elevated temperatures within the treatment furnace. Preferably, the chamber wall members are formed of a thin metallic shell, and a plurality of layers of the lining material are mounted thereto toward the interior of the chamber. In this manner the energy efficiency of the treatment furnace is substantially improved, because a substantial heat-up and cool-down period is not necessary to preserve the integrity of the sheets of lining material, unlike the situation where refractory brick forms the chamber wall members. Additionally, repair activities are greatly facilitated, with the interior surface of the treatment furnace chamber being replaceable merely by exchanging the innermost layer of lining material for a fresh one.

The treatment furnace of the present invention also includes novel exhaust gas treatment facilities, consisting of an elongated chamber defined by exterior wall members, an inlet opening adjacent a first end, and an outlet opening adjacent the opposite end. An elongated conduit member extends within the elongated chamber between the inlet and outlet openings spaced from the exterior walls of the elongated chamber to form a compartment therebetween about the periphery of the interior of the elongated chamber. The elongated conduit is formed of sidewalls which are permeable to the passage of exhaust gas therethrough. A selected material is provided in the peripheral compartment through which the exhaust gas is to pass, the selected material being reactive to portions of the exhaust gas to remove and/or chemically alter such portions. Means are mounted within the elongated conduit which direct exhaust gas from the interior of the conduit through its permeable sidewalls into the compartment of selected material. A moistened limestone material may be selected for placement within the compartment to provide an alkaline condition therein to remove acidic components of the exhaust gas. Facilities are provided for continually moistening such a limestone supply. Alternatively, an ion exchange resin material may be provided within the compartment to remove metallic content from the exhaust gas.

DESCRIPTION OF THE PREFERRED EMBODIMENTS

Figure 1:
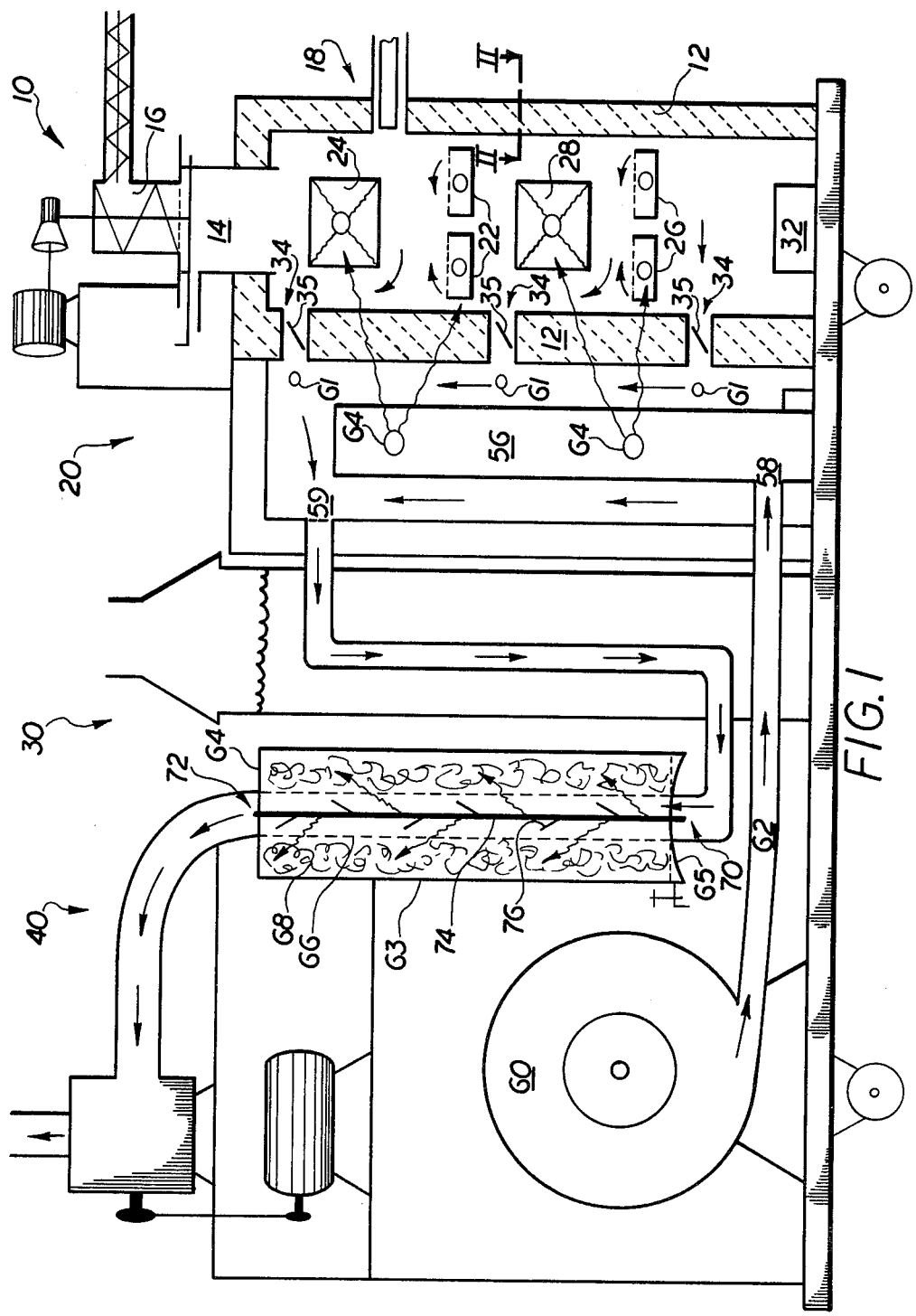
FIG. 1 is a partially schematic elevational view of a waste material treatment furnace incorporating features of the present invention.

With reference to FIG. 1, a waste material treatment facility is shown which is useful in the disposal of municipal waste sewage and industrial waste slurries. The facility includes generally a furnace chamber 10, an air preheating chamber 20, a heat exchanger unit 30, and an exhaust gas treatment chamber 40. A supply of sludge or slurry is fed into the upper area of furnace chamber 10 where it is dried and incinerated to ash as it passes toward the lower area thereof. Exhaust gases from furnace chamber 10 are advanced through the air preheating chamber 20, the heat exchanger unit 30, and the exhaust gas treatment chamber 40 prior to emission into the atmosphere. The entire facility may be conveniently mounted on a portable platform if small scale and/or intermittent use is preferred.

Preferably, the furnace chamber 10 incorporates features taught in U.S. Pat. No. 3,818,847, which teachings are hereby incorporated by reference. Thus, with continued reference to FIG. 1, furnace chamber 10 is defined by refractory walls 12 having an upper inlet opening 14 through which is fed a supply of sludge or slurry by feed mechanism 16, e.g., a screw feeder. An auxiliary ram feed unit 18 may also be provided adjacent the upper region of furnace chamber 10. Material to be treated drops onto a first pair of rotatable plates 22 past a burner unit 24, where it dries while being impinged upon by hot air emitted from orifices in the upper surface of the plates 22. At predetermined intervals the plates 22 are pivoted to drop the supported material to a second pair of rotatable plates 26, past a burner unit 28. The elevated temperatures within the furnace chamber 10 drive off the moisture in the treated material and burns combustible portions therefrom to leave an ash which is removed through an ash door 32 adjacent the bottom of the furnace chamber 10. Exhaust gases within the furnace chamber 10 are advanced through a plurality of passageways 34 past flow-control valves 35 in one of the refractory walls 12 to the interior of the air preheating chamber 20.

Figure 2:
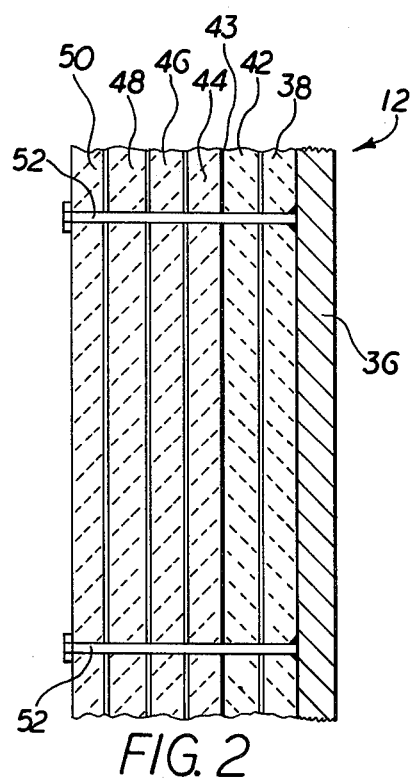
FIG. 2 is a view taken along lines 2—2 of FIG. 1.

With respect also to FIG. 2, a sectional view of one of the refractory walls 12 is shown. The wall 12 includes a metal plate 36 which provides structural integrity to wall 12, and a plurality of layers of insulating fabric 38, 42, 44, 46, 48 and 50, which are mounted contiguously on a plurality of metal studs 52 projecting from metal plate 36. In one embodiment of the invention, fabric layers 38 and 42 may be formed of mineral wool of a thickness between about 1.0 inch (2.5 cm.) and 3.0 inch (7.5 cm.). Preferably, a layer 43 is interposed between layers 42 and 44 and serves as a vapor barrier to protect the mineral wool. Layer 43 may take the form of a thin sheet of metallic foil. Fabric layers 44, 46, 48 and 50 are preferably formed of high temperature ceramic fiber sheets, having a thickness of about 0.6 inch (1.5 cm.) to 1.2 inch (3.0 cm.), and in a preferred embodiment may be formed of a ceramic fiber sheet marketed as fiberfrax by the Carborundum Co. of Niagra, N.Y. The fabric layers 38-50 are relatively light weight, flexible, and resistant to temperatures in excess of 2500° F. (1370° C.), to provide the insulating effect conventionally provided by refractory bricks without many of the undesirable characteristics thereof. For example, a conventional refractory brick-lined furnace requires a gradual and substantial heat-up and cool-down time, e.g., 24 hours, to protect the refractory brick from damaging thermal shock. Fabric layers 38-50, being flexible and non-solid, are not readily damagable by sudden temperature variations, thereby minimizing heat-up and cool-down time of the furnace chamber 10 to about one hour. Additionally, regular repairs to the interior surface of a refractory brick-lined furnace involves the replacement of a plurality of inter-connected bricks, a time consuming and expensive operation. In the practice of the present invention, where a hostile environment has damaged the innermost fabric layer 50, it only need be replaced. This is substantially more convenient than replacing the entire thickness of the insulating layer of wall 12.

Use of fabric layers 38-50 is particularly preferable with the furnace chamber 10 taught in U.S. Pat. No. 3,818,847 because, as more fully described therein, the burner units 24 and 28 have a flat flame characteristic, i.e., a forward velocity of only a few inches, such that the material to be treated drops within the furnace chamber 10 spaced from the walls 12 without substantial impingement thereon.

With continued reference to FIG. 1, the air preheating chamber 20 includes an air tank 56 having an inlet opening 58 which communicates with a blower 60 through conduit 62 to provide a positive pressure condition therein. The air tank 56 also includes a plurality of outlet openings 64 which communicate through conduits (not shown) with the burner units 24 and 28 and the rotatable plates 22 and 26 to provide pressurized preheated air thereto. The air tank 56 is surrounded within the air preheating chamber 20 by the exhaust gases which pass thereinto from the furnace chamber 10 through passageways 34, whereby a heat exchange occurs therebetween to preheat the air in air tank 56 prior to its passage to the burner units 24 and 28, and rotatable plates 22 and 26. In this manner energy efficiency of the furnace chamber 10 is substantially improved by the return thereto of a portion of the heat removed by the exhaust gases. Additionally, one or more afterburners 61 may be provided within preheating chamber 20 to more fully burn exhaust gases therein, if such is deemed necessary.

Exhaust gases advance from the air preheating chamber 20 through an outlet opening 59 directly into the heat exchanger unit 30, where they are routed through a plurality of copper tubes which pass through a tank of water. Thus, the exhaust gases are substantially cooled to render them more environmentally acceptable for subsequent dispersal into the atmosphere, while at the same time a source of heated water and/or steam is provided which may be useful for numerous purposes, not the least of which includes additional exhaust gas treatment, to be discussed more fully below.

Figure 3:
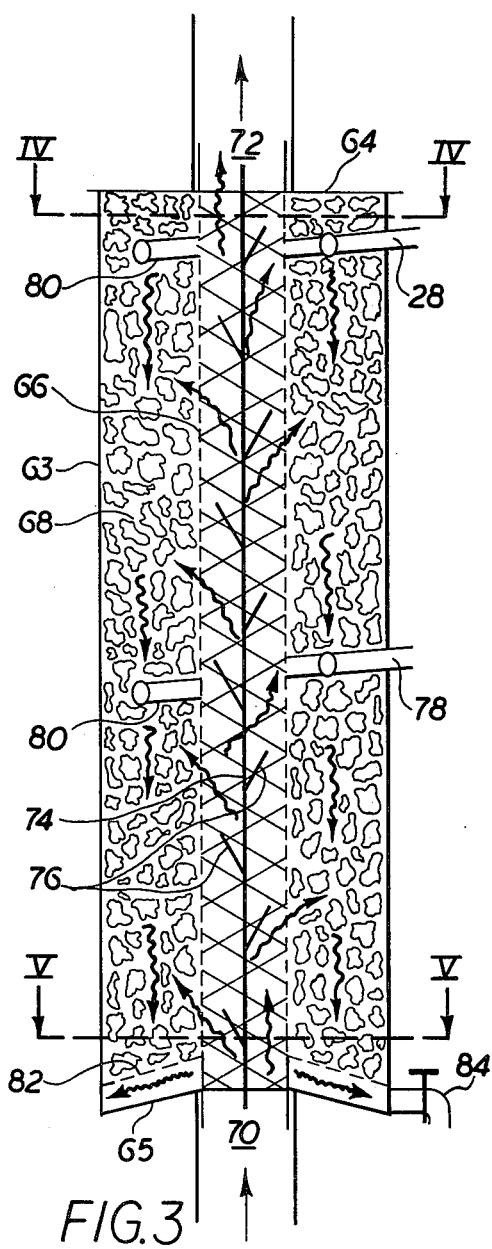
FIG. 3 is a sectional, elevational view of an exhaust gas treatment facility incorporating features of the present invention.
Figure 4:
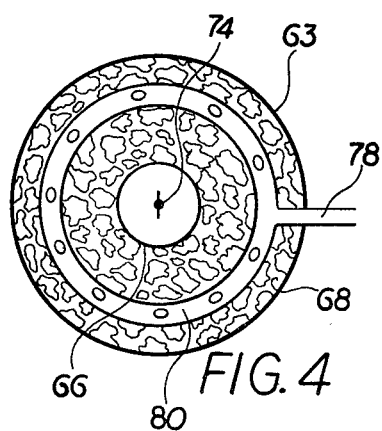
FIG. 4 is a view taken along lines 4—4 of FIG. 3.
Figure 5:
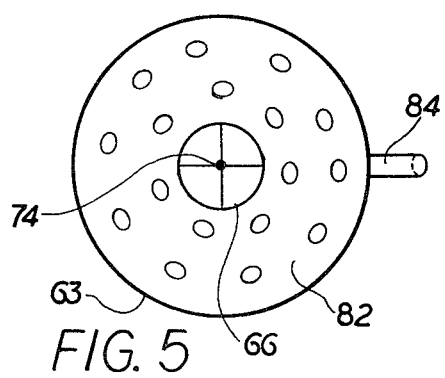
FIG. 5 is a view taken along lines 5—5 of FIG. 3.

The exhaust gases are advanced from the lower portion of the heat exchanger unit 30 into the bottom of the exhaust gas treatment chamber 40. With reference also to FIGS. 3-5, the exhaust gas treatment chamber 40 includes principally a cylindrical outerwall 63, an upper cover plate 64, a lower cover plate 65, and an inner conduit member 66 mounted between cover plates 64 and 65. A compartment 68 exists between the outerwall 63 and conduit member 66 which is conveniently filled with a selected material which is reactive with selected portions of the exhaust gas which enters the conduit member 66 at an inlet port 70 and exits therefrom at an exit port 72. Preferably, the treatment chamber 40 also includes a centrally oriented rod 74 extending through conduit member 66 and having a plurality of upwardly angled vanes 76 mounted thereto to direct the exhaust gas toward the sidewalls of conduit member 66. The sidewalls defining conduit member 66 are formed in a manner to permit the passage of exhaust gas therethrough into the compartment 68 containing the selected reactive material. In one embodiment of the invention, the sidewalls of conduit member 66 may be formed of a screen-like material having apertures of a size to permit the passage of exhaust gas while not permitting the passage of the selected reactive material therethrough. Alternatively, the sidewalls may be formed of a gas-permeable membrane.

The selected reactive material in compartment 68 is chosen to remove and/or alter portions of the exhaust gas passing therethrough. In one embodiment of the invention where it is desired to neutralize acidic portions of the exhaust gas, a supply of moistened particulate limestone may be provided within the compartment 68 to establish an alkaline condition therein. With continued reference to FIGS. 3-5, a plurality of moisture input passageways 78 may be provided through outer wall 63 to communicate with circular distribution pipes 80 mounted within the compartment 68. A perforated plate 82 is provided adjacent the bottom of compartment 68 through which excess moisture may pass for removal by drainage tap 84. The moisture passed through moisture input passageways 78 may take the form of either steam or hot water, and in either case is conveniently provided from the heat exchanger unit 30 discussed heretofore.

In an alternative embodiment of the invention, passageways 78 and distribution pipes 80 may be utilized to pump an acidic or alkaline atmosphere into the compartment 68 to facilitate the removal of undesirable elements from the exhaust gas passing therethrough.

In operation, the exhaust gas treatment chamber 40 receives exhaust gas into the lower end of conduit member 66 and directs the exhaust gas through the sidewalls thereof into compartment 68 through the flow obstructing operation of the vanes 76. The exhaust gas progresses through the restricted voids of the selected material toward the upper end of the treatment chamber 40, during which period it reacts with the selected material to remove and/or alter portions which are not to be emitted ultimately into the atmosphere. After such treatment the exhaust gas passes from the treatment chamber 40 to an exhaust stack or auxiliary pollution control facility, e.g., a baghouse collector. Means (not shown) may conveniently be provided to rotate the rod 74 about its longitudinal axis to increase the flow-obstructing effect of the vanes 76.

Of course, the treatment chamber 40 may be utilized for purposes other than the neutralization of acidic portions of the exhaust gas passing therethrough. For example, if it is desired to remove and collect metallic portions contained within the exhaust gas, the previously described limestone material may be replaced or supplemented with an ion-exchange resin material within compartment 68 which is reactive with the metallic portions to be removed. The metallic portions react with and are secured to the selected ion exchange resin material, preferably in a manner that will facilitate their subsequent recovery from the treatment chamber 40.

Of course the present invention is not intended to be limited to the details of the specific embodiments thereof described above, but rather, only by the claims to follow.

I claim:

1. Apparatus for treating exhaust gases emitted from a furnace, comprising:
    an elongated chamber defined by exterior wall members, an inlet opening adjacent a first end of said chamber for introducing said exhaust gases into said chamber, and an outlet opening adjacent a second and opposite end of said chamber for conducting said exhaust gases out of said chamber;
    an elongated conduit defined by sidewalls extending within said chamber between and in communication with said inlet opening and said outlet opening, spaced from said exterior wall members of said chamber to provide a compartment therebetween extending about the periphery of the interior of said chamber between said first and second ends thereof, said sidewalls of said elongated conduit being permeable to the passage of said exhaust gas therethrough, said compartment communicating with said inlet opening and said outlet opening only through said permeable sidewalls of said elongated conduit;
    selected material within said compartment between the exterior walls of said chamber and the sidewalls of said conduit through which said exhaust gas may pass during portions of its advancement from said first end toward said second end, said selected material reactive with at least portions of the composition of said exhaust gas to remove and/or alter said portions during passage therethrough; and
    means mounted within said elongated conduit for directing said exhaust gas from the interior of said conduit through the sidewalls thereof into said compartment for interaction with said selected material, said directing means oriented within said elongated conduit to permit the return of said exhaust gas from said compartment to said elongated conduit and therefrom to said outlet opening.

2. The apparatus as set forth in claim 1 wherein said exhaust gas includes undesirable acidic portions, wherein said selected material comprises granulated limestone of a particle size sufficient to permit the passage of exhaust gas therethrough while not able to pass through the permeable sidewalls of said conduit.

3. The apparatus as set forth in claim 2, wherein said limestone includes a moisture content sufficient to provide an alkaline atmosphere to react with and reduce the amount of said acidic portions of said exhaust gas.

4. The apparatus as set forth in claim 3, further comprising:
    means for continually introducing moisture into the limestone contained in said compartment; and
    means for removing excess moisture from said limestone contained in said compartment.

5. The apparatus as set forth in claim 1, wherein said exhaust gas includes a metallic content, wherein said selected material comprises an ion exchange material which reacts with said metallic content to remove said metallic content during the exhaust gas passage therethrough.

6. The apparatus as set forth in claims 4 or 5, wherein said directing means comprises:
    an elongated rod extending within said elongated conduit from inlet opening to said outlet opening, said rod including a plurality of gaseous flow-deflecting vanes extending toward the sidewalls of said conduit to direct said exhaust gas into said compartment.

7. The apparatus as set forth in claim 6, further comprising:
    means for rotating said rod about its central axis to reciprocate said vanes to generate exhaust gas turbulence within said conduit.

8. The apparatus as set forth in claim 7, wherein said furnace comprises:
    an incinerator for treating slurry and sludge material; and
    means for extracting heat from said exhaust gas prior to its introduction into said elongated circuit.

9. In a furnace for use in treating slurry and sludge material, comprising:
    chamber means defined by wall members and having an inlet opening and an outlet opening for advancing said slurry and sludge material therethrough; and heating means communicating with said chamber means for treating said slurry and sludge material as it is advanced through said chamber means, the improvement comprising:

said chamber means comprising a vertical chamber with said inlet opening adjacent the top thereof and said outlet opening adjacent the bottom thereof;

lining means defining at least portions of the interior surfaces of said wall members of said chamber means, said lining means comprising a flexible sheet of insulating fabric which is able to withstand temperatures up to the maximum operating temperature of said furnace to insulate and protect said wall members therefrom;

feed means adjacent said inlet opening for feeding said material to be treated into said chamber means; and at least one rotable plate means intermediate said top and bottom of said chamber means to define upper and lower chamber zones;

wherein said feed means, said heating means and said rotatable plate means each operate to advance said sludge and slurry material through said chamber means substantially out of contact with said lining means.

10. The furnace as set forth in claim 9, wherein said rotatable plate means comprises at least one pair of rotatable plate members, said pair of rotatable plate members alignable in a common horizontal plane to define said upper and lower chamber zones while supporting a quantity of said material to be treated on upper surfaces of said pair, said pair rotatable in opposite directions relative to said common horizontal plane to advance said material to be treated downwardly and toward the center portion of said chamber means.

11. The furnace as set forth in claim 10, wherein said heating means comprises burners having a flat flame characteristic, each of said burners positioned in said chamber means to urge said material to be treated away from said burner and toward the center portion of said chamber means.

12. The furnace as set forth in claim 11, wherein said wall members comprise a shell of thin metal, further comprising a plurality of layers of said lining means positioned contiguously between said shell of thin metal and the interior of said chamber means, said plurality of layers of said lining means reducing heat-up time of said furnace.

13. The furnace as set forth in claim 12, wherein the most interior of said plurality of layers of said lining means is replaceable independent of the remainder of said plurality of layers to minimize repair time and expense.

14. The furnace as set forth in claim 13, wherein said plurality of layers includes an interior layer of fiberfrax and a more exterior layer of mineral wool separated by a metallic vapor barrier layer.

15. The furnace as set forth in claim 14, wherein said rotatable plate means includes a plurality of gaseous injection nozzles on its upper surface, further comprising:

means for supplying gas to said gaseous injection nozzles to cool said plate means and impinge upon said material adjacent said plate means; and exhaust gas removing means including first means for extracting heat from said exhaust gases to preheat said gases to be supplied to said gaseous injection nozzles.

16. The furnace as set forth in claim 15, wherein said exhaust gas removing means further comprises:

second means for extracting heat from said exhaust gases to heat a supply of water.

17. The furnace as set forth in claim 16, wherein said exhaust gas removing means further comprises:

means for neutralizing noxious or toxic materials in said exhaust gas.

18. The furnace as set forth in claim 17, wherein said neutralizing means comprises:

an elongated chamber defined by exterior wall members, an inlet opening adjacent a first end of said chamber for introducing said exhaust gases into said chamber, and an outlet opening adjacent a second and opposite end of said chamber for conducting said exhaust gases out of said chamber;

an elongated conduit defined by sidewalls extending within said chamber between and in communication with said inlet opening and said outlet opening, spaced from said exterior wall members of said chamber to provide a compartment therebetween extending about the periphery of the interior of said chamber between said first and second ends thereof, said sidewalls of said elongated conduit being permeable to the passage of said exhaust gas therethrough;

selected material within said compartment between the exterior walls of said chamber and the sidewalls of said conduit through which said exhaust gas may pass from said first end toward said second end, said selected material reactive with at least portions of the composition of said exhaust gas to remove and/or alter said portions during passage therethrough; and means mounted within said elongated conduit for directing said exhaust gas from the interior of said conduit through the sidewalls thereof into said compartment for interaction with said selected material.

19. The furnace as set forth in claim 18, further comprising:

means for introducing said supply of heated water from said second heat extracting means to said selected material within said compartment of said neutralizing means.

20. Apparatus for treating exhaust gases emitted from a furnace, comprising:

an elongated chamber defined by exterior wall members, an inlet opening adjacent a first end of said chamber for introducing said exhaust gases into said chamber, and an outlet opening adjacent a second and opposite end of said chamber for conducting said exhaust gases out of said chamber;

an elongated conduit defined by sidewalls extending within said chamber between and in communication with said inlet opening and said outlet opening, spaced from said exterior wall members of said chamber to provide a compartment therebetween extending about the periphery of the interior of said chamber between said first and second ends thereof, said sidewalls of said elongated conduit being permeable to the passage of said exhaust gas therethrough;

selected material within said compartment between the exterior walls of said chamber and the sidewalls of said conduit through which said exhaust gas may pass from said first end toward said second end, said selected material reactive with at least portions of the composition of said exhaust gas to remove and/or alter said portions during passage therethrough; and means mounted within said elongated conduit for directing said exhaust gas from the interior of said conduit through the sidewalls thereof into said compartment for interaction with said selected material;

wherein said exhaust gas includes undesirable acidic portions, said selected material comprising granulated limestone of a particle size sufficient to permit the passage of exhaust gas therethrough while not able to pass through the permeable sidewalls of said conduit; said limestone including a moisture content sufficient to provide an alkaline atmosphere to react with and reduce the amount of said acidic portions of said exhaust gas, said apparatus further including:

means for continually introducing moisture into the limestone contained in said compartment; and means for removing excess moisture from said limestone contained in said compartment.

21. Apparatus for treating exhaust gases emitted from a furnace, comprising:

an elongated chamber defined by exterior wall members, an inlet opening adjacent a first end of said chamber for introducing said exhaust gases into said chamber, and an outlet opening adjacent a second and opposite end of said chamber for conducting said exhaust gases out of said chamber;

an elongated conduit defined by sidewalls extending within said chamber between and in communication with said inlet opening and said outlet opening, spaced from said exterior wall members of said chamber to provide a compartment therebetween extending about the periphery of the interior of said chamber between said first and second ends thereof, said sidewalls of said elongated conduit being permeable to the passage of said exhaust gas therethrough;

selected material within said compartment between the exterior walls of said chamber and the sidewalls of said conduit through which said exhaust gas may pass from said first end toward said second end, said selected material reactive with at least portions of the composition of said exhaust gas to remove and/or alter said portions during passage therethrough; and means mounted within said elongated conduit for directing said exhaust gas from the interior of said conduit through the sidewalls thereof into said compartment for interaction with said selected material;

wherein said exhaust gas includes a metallic content, wherein said selected material comprises an ion exchange material which reacts with said metallic content to remove said metallic content during exhaust gas passage therethrough; and wherein said directing means includes an elongated rod extending within said elongated conduit from said inlet opening to said outlet opening, said rod including a plurality of gaseous flow-deflecting valves extending towards the sidewalls of said conduit to direct said exhaust gas into said compartment.

* * * * *